US010009709B2

(12) United States Patent
Putterman et al.

(10) Patent No.: US 10,009,709 B2
(45) Date of Patent: Jun. 26, 2018

(54) ELECTRONIC DEVICE WITH NETWORK ACCESS VIA MOBILE DEVICE PROXY

(71) Applicant: Medea Inc., Pleasanton, CA (US)

(72) Inventors: Jed Putterman, Mill Valley, CA (US); Brandon S. Laidlaw, Pleasanton, CA (US); Margaret L Taylor, Incline Village, NV (US)

(73) Assignee: Medea Inc., Pleasanton, CA (US)

( * ) Notice: Subject to any disclaimer, the term of this patent is extended or adjusted under 35 U.S.C. 154(b) by 0 days. days.

(21) Appl. No.: 14/789,648

(22) Filed: Jul. 1, 2015

(65) Prior Publication Data

US 2016/0286543 A1 Sep. 29, 2016

Related U.S. Application Data

(60) Provisional application No. 62/138,944, filed on Mar. 26, 2015.

(51) Int. Cl.

| | |
|---|---|
| ***H04W 72/00*** | (2009.01) |
| ***H04W 4/00*** | (2018.01) |
| ***H04W 76/02*** | (2009.01) |
| ***H04W 4/02*** | (2018.01) |
| ***H04W 8/00*** | (2009.01) |

(52) U.S. Cl.

CPC ........... *H04W 4/008* (2013.01); *H04W 4/025* (2013.01); *H04W 8/005* (2013.01); *H04W 76/021* (2013.01)

(58) Field of Classification Search

CPC ..... H04W 4/008; H04W 4/025; H04W 8/005; H04W 76/021

See application file for complete search history.

(56) References Cited

U.S. PATENT DOCUMENTS

| | | | |
|---|---|---|---|
| 1,262,788 | A | 4/1918 | Heidenreich |
| 1,554,191 | A | 3/1924 | Alexander |
| 1,653,608 | A | 3/1927 | Allen |

(Continued)

FOREIGN PATENT DOCUMENTS

| | | | |
|---|---|---|---|
| CN | 2538046 | Y | 2/2003 |
| CN | 200981249 | Y | 11/2007 |

(Continued)

OTHER PUBLICATIONS

Lee , "understanding and using iBeacons", May/Jun. 2014, CODE Magazine , hyperlink: http://www.codemag.com/Article/1405051.*

(Continued)

*Primary Examiner* — Kathy Wang-Hurst
*Assistant Examiner* — Said Elnoubi
(74) *Attorney, Agent, or Firm* — Lowenstein Sandler LLP

(57) ABSTRACT

A mobile computing device that lacks a network connection receives a low energy radio signal comprising a unique identifier assigned to the electronic device. The mobile computing device sends a query to a remote server computing device, the query comprising the unique identifier and information identifying a user of the mobile computing device. The mobile computing device receives a response from the remote server computing device, the response indicating that the user is authorized to access the electronic device. The mobile computing device notifies the user of a presence of the electronic device and establishes a wireless connection to the electronic device.

22 Claims, 7 Drawing Sheets

(56) References Cited

U.S. PATENT DOCUMENTS 1,769,147 A 12/1927 Lennon
1,686,354 A 10/1928 Wallace
1,856,550 A 12/1928 Guenard
1,770,093 A 2/1929 West
3,864,976 A 2/1975 Parker
3,965,590 A 6/1976 Algaze
3,996,879 A 12/1976 Walton
4,607,756 A 8/1986 Courtman
4,765,465 A 8/1988 Yamada et al.
4,928,412 A 5/1990 Nishiyama
5,125,866 A 6/1992 Arad et al.
5,168,646 A 12/1992 Dippong et al.
5,201,431 A 4/1993 Berger et al.
5,211,699 A 5/1993 Tipton
5,297,247 A 3/1994 Kan
5,339,548 A 8/1994 Russell
5,347,453 A 9/1994 Maestre
5,379,916 A 1/1995 Martindale et al.
5,553,735 A 9/1996 Kimura
5,575,553 A 11/1996 Tipton
5,678,925 A 10/1997 Garmaise et al.
5,774,876 A 6/1998 Woolley et al.
5,823,346 A 10/1998 Weiner
5,863,752 A 1/1999 Court et al.
5,884,421 A 3/1999 Key
5,992,678 A 11/1999 Willey
6,037,872 A 3/2000 Dunnum
6,062,380 A 5/2000 Dorney
6,084,526 A 7/2000 Blotky et al.
6,158,870 A 12/2000 Ramirez
6,213,616 B1 4/2001 Chien
6,302,608 B1 10/2001 Holmes et al.
6,393,401 B1 5/2002 Loudermilk et al.
6,406,348 B1 6/2002 Pearce
6,504,481 B2 1/2003 Teller
6,527,402 B1 3/2003 Borri
6,588,131 B2 7/2003 O'Connell, Jr.
6,588,593 B2 7/2003 Woskoski
6,747,918 B2 6/2004 Hight et al.
6,762,734 B2 7/2004 Blotky et al.
6,856,932 B1 2/2005 Wallace
6,872,116 B1 3/2005 Dunnum et al.
6,898,572 B2 5/2005 Ohyama
6,923,549 B2 8/2005 Hoy
6,945,418 B2 9/2005 Guido et al.
7,000,343 B1 2/2006 Teichman
7,086,075 B2 8/2006 Swix et al.
7,152,832 B2 12/2006 Wochnick
7,163,311 B2 1/2007 Kramer
7,175,266 B2 2/2007 Helterline
7,188,350 B2 3/2007 Rosowski
7,188,491 B2 3/2007 Donald, II et al.
7,300,171 B2 11/2007 Sutton
7,383,650 B2 6/2008 Duesler
7,412,505 B2 * 8/2008 Slemmer ................ G06F 9/542
706/47
7,413,082 B2 8/2008 Adler et al.
7,535,337 B2 5/2009 Overhultz et al.
7,593,867 B2 9/2009 Deakin et al.
7,613,431 B2 11/2009 Brand
7,690,533 B2 4/2010 Stilley
7,824,051 B2 11/2010 Walter et al.
7,837,333 B2 11/2010 Chou et al.
7,934,845 B2 5/2011 Yang
7,954,970 B2 6/2011 Goldburt
8,056,273 B2 11/2011 Goldburt
8,123,033 B2 2/2012 Goldburt
8,232,981 B2 7/2012 Sandy
8,989,673 B2 3/2015 Sandy
9,061,797 B2 6/2015 Goldburt
9,152,968 B2 10/2015 Goldburt
9,216,844 B2 12/2015 Goldburt
9,376,235 B2 6/2016 Goldburt
9,628,434 B2 4/2017 Laidlaw et al.
2002/0070861 A1 6/2002 Teller
2002/0097195 A1 7/2002 Frank
2002/0104848 A1 8/2002 Burrows et al.
2002/0126150 A1 9/2002 Parry
2002/0169635 A1 11/2002 Shillingburg
2002/0190869 A1 12/2002 Blotky et al.
2003/0076672 A1 4/2003 Head
2003/0099158 A1 5/2003 De la Huerga
2003/0122730 A1 7/2003 Frank et al.
2003/0129283 A1 7/2003 Martinez Carballido
2003/0210141 A1 11/2003 Iacovino
2003/0226298 A1 12/2003 Bjork
2004/0004829 A1 1/2004 Policappelli
2004/0026357 A1 2/2004 Beck et al.
2004/0076109 A1 4/2004 Rosowski
2004/0111640 A1 * 6/2004 Baum ................ H04L 61/2015
726/13
2004/0118022 A1 6/2004 Duesler
2004/0140286 A1 7/2004 Zoller
2004/0148117 A1 7/2004 Kirshenbaum et al.
2004/0163103 A1 8/2004 Swix et al.
2004/0195117 A1 10/2004 Brand
2004/0206828 A1 10/2004 Harris
2004/0237574 A1 12/2004 Donald, II et al.
2005/0021406 A1 1/2005 Ohyama
2005/0024858 A1 2/2005 Johnson
2005/0036301 A1 2/2005 Haines
2005/0134461 A1 6/2005 Gelbman et al.
2005/0152392 A1 7/2005 Lim et al.
2005/0154644 A1 7/2005 Deakin et al.
2005/0161558 A1 7/2005 Stahl et al.
2005/0168544 A1 8/2005 Helterline
2005/0193612 A1 9/2005 Lowry
2005/0205437 A1 9/2005 Huffman et al.
2005/0207141 A1 9/2005 Boesch et al.
2005/0229449 A1 10/2005 Shepley
2005/0270396 A1 12/2005 Miyashita et al.
2006/0022806 A1 2/2006 Auerbach
2006/0087831 A1 4/2006 Kramer
2006/0118507 A1 6/2006 Feldman
2006/0139928 A1 6/2006 Griffiths et al.
2006/0191812 A1 8/2006 Oudekerk et al.
2006/0202042 A1 9/2006 Chu
2006/0207907 A1 9/2006 Meehan
2006/0231109 A1 10/2006 Howell et al.
2007/0024465 A1 2/2007 Howell et al.
2007/0035380 A1 2/2007 Overhultz et al.
2007/0055566 A1 3/2007 Gaughan et al.
2007/0069883 A1 3/2007 Collier, Jr. et al.
2007/0091123 A1 4/2007 Akashi
2007/0158293 A1 7/2007 Andreani
2007/0191983 A1 8/2007 Griffits et al.
2007/0214055 A1 9/2007 Temko
2007/0226079 A1 9/2007 Chessick
2007/0299778 A1 12/2007 Haveson et al.
2008/0010871 A1 1/2008 Holmes et al.
2008/0023357 A1 1/2008 Whiteis
2008/0034628 A1 2/2008 Schnuckle
2008/0074625 A1 3/2008 Lai et al.
2008/0083767 A1 4/2008 O'Neal
2008/0100469 A1 5/2008 Goldburt
2008/0108308 A1 5/2008 Ullah
2008/0128300 A1 6/2008 Bahar et al.
2008/0149589 A1 6/2008 Lach
2008/0178251 A1 7/2008 Shin
2008/0243919 A1 10/2008 Ullmann
2008/0264816 A1 10/2008 Yeh
2008/0296191 A1 12/2008 Ransch
2008/0314861 A1 12/2008 Goldburt
2008/0317906 A1 12/2008 Goldburt
2008/0319876 A1 12/2008 Goldburt
2009/0159761 A1 6/2009 Sandy
2009/0293328 A1 12/2009 Bull
2010/0101124 A1 4/2010 Sorensen
2010/0153222 A1 * 6/2010 Pandey ................ G06Q 20/204
705/17
2010/0182518 A1 7/2010 Kirmse et al.
2010/0300913 A1 12/2010 Goldburt
2010/0300914 A1 12/2010 Goldburt et al.
2011/0100852 A1 5/2011 Goldburt

(56) References Cited

U.S. PATENT DOCUMENTS

2011/0100853 A1 5/2011 Goldburt
2011/0122120 A1 5/2011 Feuilloley
2011/0155603 A1 6/2011 Goldburt
2011/0155604 A1 6/2011 Goldburt
2011/0303579 A1 12/2011 Sanders
2012/0019398 A1 1/2012 Vogt et al.
2012/0105424 A1 5/2012 Lee et al.
2012/0171963 A1 7/2012 Tsfaty
2012/0239470 A1 9/2012 Goldburt
2012/0273372 A1 11/2012 Goldburt et al.
2013/0319892 A1 12/2013 Goldburt
2014/0020061 A1* 1/2014 Popp ........................ G06F 21/73 726/3
2014/0094126 A1 4/2014 Sandy
2014/0155031 A1* 6/2014 Lee ........................ G06F 21/35 455/411
2014/0292496 A1 10/2014 Tredoux et al.
2014/0324585 A1* 10/2014 Mederos ............ G06Q 30/0257 705/14.55
2014/0351866 A1 11/2014 Wang
2015/0012433 A1* 1/2015 Yang .................... G06Q 20/227 705/44
2015/0334079 A1 11/2015 Laidlaw et al.
2016/0018803 A1 1/2016 Goldburt
2016/0065805 A1 3/2016 Goldburt
2016/0143228 A1* 5/2016 De Groot ................. A01G 9/24 700/284
2016/0286543 A1 9/2016 Putterman et al.
2017/0193795 A1 7/2017 Laidlaw et al.

FOREIGN PATENT DOCUMENTS

CN 200983162 Y 11/2007
EP 0 482 680 A1 4/1992
EP 1 731 068 A1 12/2006
GB 2 346 315 A 8/2000
JP H07-027624 A 1/1995
KR 10-2011-0008861 A 1/2011
KR 10-2012-0018246 A 3/2012
KR 10-2013-0011352 A 1/2013
WO 2003/013959 A2 2/2003
WO 03/099039 A1 12/2003
WO 2013/179239 A1 12/2013
WO 2015/175836 A1 11/2015

OTHER PUBLICATIONS

Lee, understanding and using iBeacons, CODE Magazine May/Jun. 2014, hyperlink:http://www.codemag.com/article/1405051.*

International Search Report and Written Opinion of the International Searching Authority for PCT Application No. PCT/US2016/013630 dated May 13, 2016.

McHenry, Q., "iPhone: change the Auto-Lock Delay," 3 pages, http://www.tech-recipes.com/rx/2484/iphone_change_the_auto_lock_delay/, Jun. 29, 2007.

"Search Report IEC 3600", dated Nov. 19, 2009, Scientific and Technical Information Center, 36 pages.

Geesche Jacobsen "Wine of the future: just add water" Jun. 24, 2003, http://www.smh.com.au/articles/2003/06/23/1056220544761.html.

Anthony Rose "The Future of the bottle" Jun. 21, 2003, http://www.independent.co.uk/life-style/food-and-drink/features/the-future-of-the-bottle-109770.html.

English abstract of Chinese patent application No. 200983162, filed Nov. 28, 2007.

English abstract of Chinese patent application No. 200981249, filed Nov. 28, 2007.

English abstract of Chinese patent application No. 2538046, filed Feb. 26, 2003.

* cited by examiner

ELECTRONIC DEVICE WITH NETWORK ACCESS VIA MOBILE DEVICE PROXY

RELATED APPLICATIONS

This patent application claims the benefit under 35 U.S.C. § 119(e) of U.S. Provisional Application No. 62/138,944, filed Mar. 26, 2015, which is herein incorporated by reference.

TECHNICAL FIELD

Implementations described herein generally relate to electronic devices and more particularly to electronic devices (e.g., low power electronic devices) that are capable of being attached to or integrated with objects and that can be controlled by mobile computing devices.

BACKGROUND

Objects such as beverage containers are often decorated with static designs and letters to attract the attention of prospective consumers. The static designs and letters are selected by the manufacturers and are not modifiable by a distributor, retailer or end consumer. Often in a retail setting, such as a store or bar, the beverage containers are placed on shelves to enhance their visibility to passing consumers.

BRIEF DESCRIPTION OF THE DRAWINGS

Embodiments of present invention are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

Reference will now be made to the accompanying drawings showing examples of the present application, and in which.

DETAILED DESCRIPTION

Figure 1:
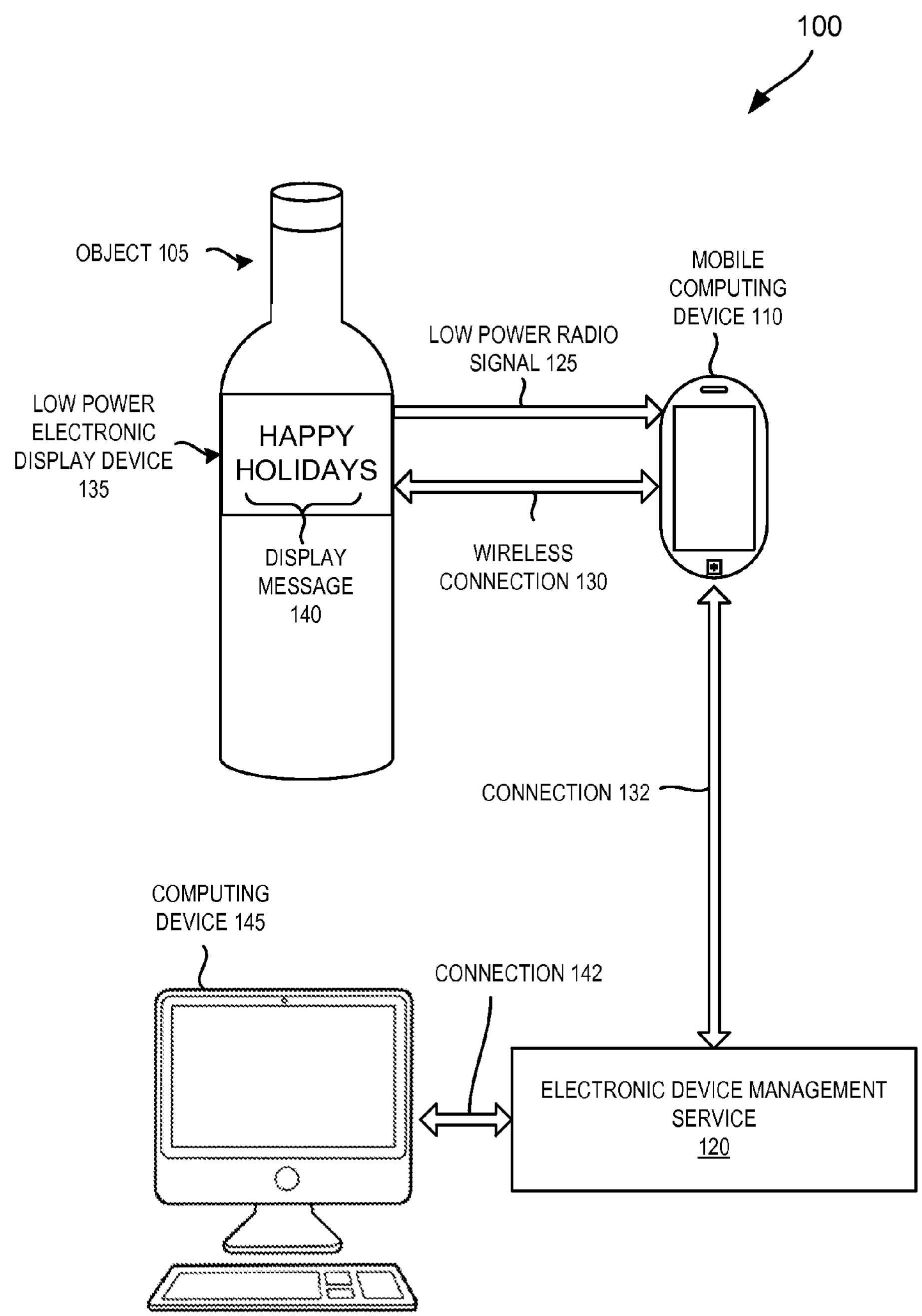
FIG. 1 is a diagram depicting an example system architecture for an electronic display device integrated with an object and wirelessly connected to a mobile computing device, in accordance with an embodiment of the present disclosure.

Described herein are objects, such as beverage containers, with low power electronic devices (e.g., electronic display devices) that include wireless modules that use multiple wireless protocols to efficiently communicate with computing devices (e.g., mobile computing devices). As used herein, a low power electronic device is an electronic device that runs on a battery and that typically does not have access to frequent charging. Thus, low power electronic devices are devices for which battery life conservation may be important, and which may be optimized to extend battery life. The low power electronic devices may also be standalone devices that are not attached to beverage containers (e.g., bottles) or other objects. The electronic devices use a first low energy unidirectional wireless protocol (e.g., the iBeacon® protocol or other Bluetooth® low energy (BLE) protocol) to transmit information usable to identify the electronic devices. The electronic devices additionally use a second higher energy bidirectional wireless protocol (e.g., a Bluetooth protocol) to establish wireless connections with computing devices (e.g., mobile computing devices). The low power electronic device may not be connected to a network (e.g., may not include a Wi-Fi network adapter or modem), and may rely on another computing device to act as a proxy for communication with a cloud based service. The cloud based service may include logic for controlling the low power electronic device, granting access to the electronic device, and so on. By using a low energy wireless protocol such as iBeacon to broadcast an identity of the low power electronic device and using a higher energy wireless protocol such as Bluetooth to establish connections to those mobile computing devices that satisfy criteria, energy usage of the low power electronic device may be minimized and battery life may be maximized.

Also described herein are an electronic device controller application that executes on a mobile computing device and an electronic device management service that runs on a server computing device. The electronic device controller application may receive data (e.g., a unique identifier) from low power electronic devices and forward such data to the electronic device management service for processing. The electronic device controller may act as a proxy (e.g., an Internet proxy) for the low power electronic device, which may not have a capability to access the Internet or remote services.

There are shown in the drawings and will herein be described in detail several specific examples with the understanding that the present disclosure is to be considered as an exemplification of the principles of the described technology and is not intended to limit the technology to the examples illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise.

It will be understood that like or analogous elements and/or components, referred to herein, may be identified throughout the drawings with like reference characters. It will be further understood that several of the figures are merely schematic representations of embodiments of the present technology.

Embodiments are discussed herein with reference to electronic display devices that are mounted to or embedded in a container or bottle. However, embodiments also cover other types of electronic devices that mount to or are embedded in a container. Such other electronic devices may rely on displays of computing devices (e.g., of mobile devices carried by users) to display messages. Accordingly, it should be understood that discussion of electronic display devices herein also applies to other types of electronic devices that do not have displays. Additionally, embodiments also apply to standalone electronic devices that do not attach to any specific containers or other objects. Additionally, embodiments are discussed with reference to low power electronic devices. However, it should be understood that embodiments also apply to other types of electronic devices (e.g., higher power electronic devices).

Referring to the figures, FIG. 1 is a diagram depicting an example system architecture 100 for a low power electronic display device 135 integrated with an object 105 and wirelessly connected to a mobile computing device 110, in accordance with an embodiment of the present disclosure. Object 105 may be a container such as a bottle, box, cup, package, etc. that includes a cavity or recess shaped to receive the low power electronic display device 135. Accordingly, the electronic display device 135 may be shaped to fit into the cavity or recess. The object may also be other types of objects, such as a vehicle, wall, hat, etc. that includes a cavity shaped to receive the low power electronic display device 135. In the illustrated example, the object 105 is a glass bottle for alcoholic beverages.

The low power electronic display device 135 is attached to the object (e.g., mounted in the cavity shaped to receive the low power electronic display device 135). Low power electronic display device 135 may be attached to object 105, such that it appears to be integrated with the object 105. In one example, the low power electronic display device 135 may utilize an attachment mechanism (e.g., clip, magnets, adhesive) to attach to object 105 while the object is in use or on display. The electronic display device 135 may be detached from the object 105 via the attachment, such as for use on another object. For example, electronic display device 135 may be attached to a beverage container while the beverage container contains fluid. However, once the beverage container is empty, electronic display device 135 may be removed from the beverage container and temporarily attached to another object.

In some examples, electronic display device 135 may be a device that conforms to the shape of the object 105 and attached thereto, such as by wrapping or snapping onto the object (e.g., a bottle). Such an electronic display device 135 may adapt to any shape or size of container or other object. Optionally, such an electronic display device 135 may have a flexible screen or include a flexible image film technology to wrap around or as a "sleeve" to any object or container or product wrapper. For example, the electronic display device 135 may include a module with active components (e.g., LEDs, processing device, memory, battery, etc.) that is connected to a sleeve that can fit around a bottle. The sleeve may be plastic, polymer, rubber, or other flexible material. The sleeve may stretch to conform to the shape of the object that it is fit around. Optionally, portable displays may be interchangeable between objects and be associated with the object it is attached to. Other embodiments may include an electronic device molded or printed onto the outer surface of the object or embedded within the material of the object. Such an electronic device may include a display that is visible when viewing the object. The electronic device may be powered using a power source, such as a battery, solar cells, or other similar power sources.

The low power electronic display device 135 includes a wireless module that periodically broadcasts a low power radio signal 125. The low power radio signal may be broadcast every second, every 2 seconds, every half second, every 10 seconds, or at some other interval. The low power radio signal may be transmitted using a protocol such as Bluetooth low energy (BLE) or iBeacon, and may include a unique identifier assigned to the low power electronic device 135. In one embodiment, the unique identifier includes a universally unique identifier (UUID) that identifies an original equipment manufacturer (OEM) of the electronic display device 135, a first assigned numerical value and a second assigned numerical value. If the iBeacon protocol is used, the low power radio signal 125 includes the UUID, a major and a minor, where the major and minor are each 2 byte values.

A mobile computing device 110 executing an electronic device controller application (not shown) may enter a range of the low power electronic device 135 and receive the low power radio signal. The mobile computing device 110 may be a mobile phone, a tablet computer, a laptop computer, a portable game console, a digital camera, or other computing device. The electronic device controller application (App) may be configured for communicating with low power electronic devices of the OEM, and may include a user interface that enables a user of the mobile computing device 110 to control such low power electronic display devices 135.

The mobile computing device 110 may establish and/or maintain a wireless connection with a wireless carrier and/or with a local area network (e.g., via a wireless access point attached to the local area network). Through the wireless connection to the wireless carrier or local area network (LAN), the mobile computing device may establish and/or maintain a connection to an electronic device management service 120. Responsive to receiving the low power radio signal, the mobile computing device 110 may generate a query that includes the received unique identifier (or a portion thereof, such as the major and minor) and information that identifies a user of the mobile computing device. The information that identifies the user of the mobile computing device may be user account information of a user logged into the electronic device controller application. The mobile computing device 110 may also determine its current location (e.g., latitude and longitude) and include the current location in the query. The mobile computing device 110 may then transmit the query to the electronic device management service 120 via the connection 132.

Electronic device management service 120 processes the query to determine whether the user has permission to access the low power electronic device and/or to determine whether any actions should be taken. In one embodiment, the electronic device management service 120 determines whether the user has permission to access the low power electronic display device 135 and sends a response to the mobile computing device 110 indicating whether the user has such permission. If the user has permission to access the low power electronic device 135, then mobile computing device 110 notifies the user of the presence of the low power electronic display device 135. Such notification may be performed by displaying an identity (e.g., assigned name) of the low power electronic device 135 in a display of the mobile computing device 110, triggering a haptic feedback module, generating an audio alert, and so on.

Bluetooth devices generally broadcast a small amount of information about themselves to allow them to be discovered. The broadcast information lets other applications and devices know the basic category of a Bluetooth device. However, there are no standards for broadcasting and discovering other information about a Bluetooth device. Given the large numbers of Bluetooth devices that may be found in an area (e.g., cell phones, computers, wireless keyboards, wireless mice, wireless headsets, etc.), it may be very cumbersome and time consuming for one Bluetooth device to discover a specific other Bluetooth device.

In embodiments, by combining the periodically broadcast low energy radio signal (e.g., iBeacon signal) with access to a back-end electronic device management service 120, the mobile computing device 110 is able to quickly determine which low power electronic devices of interest (e.g., those manufactured by a particular OEM) are nearby without having to connect to every Bluetooth-enabled device and read its characteristics. This may reduce discovery time for Bluetooth devices from minutes down to seconds.

Once mobile computing device 110 receives notification that the user has access to the low power electronic display device 135, mobile computing device may present multiple command options for controlling the low power electronic display device 135 via the user interface of the electronic device controller application. Such command options may include options to generate a message, send the message to the low power electronic display device 135, cause the low power electronic display device to display the message or another message already stored on the low power electronic display device, receive a battery level indication from the electronic display device, remotely power down the low power electronic display device 135, and so on. Mobile computing device 110 may additionally establish a wireless connection 130 (e.g., using a bidirectional wireless communication protocol such as Bluetooth), and may send commands and/or messages to the low power electronic display device 135 via the wireless connection 130. For example, a user may type in the display message 140 "HAPPY HOLIDAYS" via the user interface and may then send the display message 140 to the low power electronic device 135 for display thereon.

As described above, the combination of a periodic low energy radio signal with basic device information (e.g., a unique identifier) and a back-end electronic device management service enable quick discovery of low power electronic devices in an area. This combination of the periodic low energy radio signal with basic device information and a back-end electronic device management service to identify the low power electronic devices based on the device information also enables groups of specific devices to be updated or controlled in seconds, regardless of how large the group of electronic devices and how many other Bluetooth-enabled devices are in the area. In prior systems the process of updating a group of Bluetooth-enabled devices would typically involve discovering every Bluetooth-enabled device in an area, iterating through all of the discovered devices and interrogating those devices for their characteristics to determine whether they belong in the desired group. This process would take a large amount of time, especially if many of the low power electronic devices were present and enabled in the same area, such as at a bar or retail store.

In one embodiment, the low power electronic display device 135 may not be owned by the user of mobile computing device 110. Responsive to electronic device management service 120 receiving the query from mobile computing device 110, electronic device management service 120 may determine an owner of the low power electronic display device 135, and may send a notification to that user (e.g., via email, text message, etc.). The notification may indicate an identity of the user of the mobile computing device 110 and/or a location of the low power electronic display device 135. Alternatively, electronic device management service 120 may log the query, and the owner may use a computing device 145 to connect to the electronic device management service 120 (e.g., via a Web browser), and may view the log.

In some instances, the owner of the low power electronic display device 135 may use the computing device 145 to provide an instruction to the electronic device management service 120 for controlling the low power electronic display device 135. The electronic device management service 120 may then send an instruction to the mobile computing device with a command to forward the instruction on to the low power electronic display device 135. In some embodiments, this may be performed even if the user of the mobile computing device 110 does not have access to the low power electronic display device 135.

Figure 2:
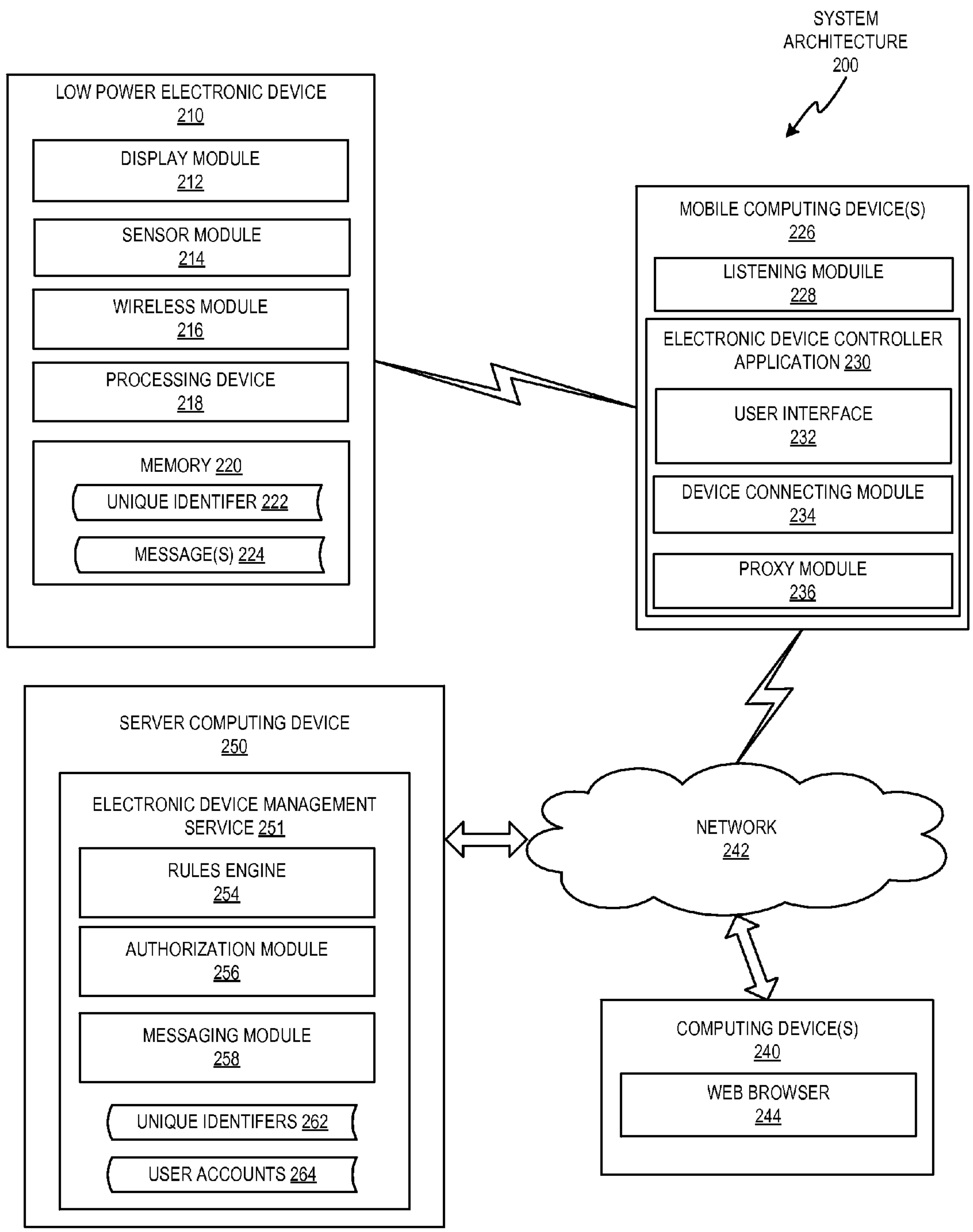
FIG. 2 is a block diagram depicting an example system architecture for a low power electronic device wirelessly connected to a mobile computing device, in accordance with another embodiment of the present disclosure.

FIG. 2 is a block diagram depicting an example system architecture 200 including a low power electronic device 210, one or more computing devices 226, and a server computing device 250. In one embodiment, system architecture 200 corresponds to system architecture 100 of FIG. 1. Low power electronic device 210 may be communicably coupled to the one or more mobile computing devices 226 via wireless connections. As discussed above, these wireless connections (e.g., Bluetooth connections) may be established responsive to server computing device 250 determining that the mobile computing devices 226 have permission to access the low power electronic device 210. In one example, low power electronic device 210 may be a portable display associated with or a part of (e.g., integrated into) an object, such as a beverage container. Alternatively, an electronic device that does not include a display and/or that is not attached to any other object may be used.

Low power electronic device 210 may include a display module 212, a sensor module 214, a wireless module 216, a processing device 218, a memory 220, and/or other hardware, firmware and/or software modules. Memory 220 may store an assigned unique identifier 222 of that identifies an OEM associated with the low power electronic device and uniquely identifies the low power electronic device 210 of that OEM. Memory 220 may additionally store one or more messages 224 that may be displayed by display module 212. In one embodiment, memory 220 also stores a password. In one embodiment, one or more of the wireless module 216, processing device 216 and/or memory 220 are components of a system on a chip (SoC).

Display module 212 may include an electronic visual display that may be illuminated to display an image or alphanumeric message. The image or alphanumeric message may be static or may be displayed in a manner that appears to show movement (e.g., motion picture or scrolling text). The electronic visual display may include light emitting diodes (LEDs), organic light emitting diodes (OLEDs), liquid crystal display (LCD), or other similar display technology. Display module 212 may have a variety of sizes and include pixels of various colors. In one example, display module 212 may cover a portion of an object's exterior face or the entire exterior face of the object in all angles (0 degrees to 360 degrees).

In one example, display module 212 may be used for advertising or displaying various images or messages, such as greetings, calendar events (e.g., birthdays, anniversaries, holiday messages, events of cultural significance), etc. Optionally, the display module 212 may utilize animated images or messages. For example, messages may scroll from any direction, strobe, glow, etc. The messages or images may allow objects holding the low power electronic devices to serve as an advertising or marketing channel. The marketing channel may allow for multiple levels of distribution (e.g., directly to customers, through a distributor, etc.). A customizable communication or message allows for maximum flexibility.

Sensor module 214 may include one or more sensor devices for gathering data associated with the object and/or low power electronic display device 210. The sensor devices may include audio sensors (e.g., microphones), motion sensors (e.g., accelerometer, gyroscope, etc.), fluid measuring sensors (e.g., mechanical gyrator), lights sensors (e.g., ambient light sensor), location sensors (e.g., global positioning system sensors (GPS)), temperature sensor (e.g., thermometer), or other similar sensing devices. Data generated by sensor module 214 may be forwarded by mobile computing devices 226 to server computing device 250 for processing. For example, an audio signal may be sent to server computing device 250 to perform speech to text processing.

Wireless module 216 may enable low power electronic device 210 to receive and transmit messages and commands. Wireless module 216 may include a transmitter, receiver, transceiver, memory, antenna, and so forth for communicating with a computing device (e.g., with mobile computing devices 226). In one embodiment, wireless module 216 includes a Bluetooth wireless adapter capable of communicating using multiple different Bluetooth based protocols. Alternatively, wireless module 216 may include a wireless adapter that uses protocols for Near Field Communication (NFC), Wi-Fi®, infrared (IR), Linux® wireless, Zigbee®, any other low frequency RF modulation, microwave, radar, or other similar connections.

Wireless module 216 may be used to initiate or establish wireless connections to mobile computing devices 226. The connections may include direct connections and indirect connections. Direct connections may directly connect low power electronic device 210 with a mobile computing device 226 and may not use any intermediate networking elements (e.g., access point, router, switch, hub) to connect the devices. This may be implemented using a wireless technology such as Bluetooth, Peer-to-Peer Wi-Fi, or infrared. An indirect connection may include multiple connections, a network 242 or multiple networks.

In one embodiment, when wireless module 216 receives a connection request from a mobile computing device 226, wireless module 216 checks for a password included in the connection request. Wireless module 216 checks the received password against a stored password in the memory 220. If the passwords match, then wireless module 216 permits a wireless connection to be established. If the passwords fail to match, then no connection may be established. Thus, in embodiments the lower power electronic device 210 may only accept application programming interface (API) requests that are sent with the correct password.

In one embodiment, the low power electronic device 210 includes two buttons usable for basic control of the electronic device. The two buttons may include a power button, which may be used to turn on and off the low power electronic device. In one embodiment, the power button is usable to toggle through different modes of operation for the low power electronic device 210. The modes of operation may include an unpowered mode, a sleep mode in which most of the components of the low power electronic display are unpowered (e.g., in which no radio signals are broadcast and a display is disabled), a display state in which a message is displayed by the display module 212 and the wireless module periodically transmits a low power radio signal, and/or a broadcast mode in which the display module 212 is unpowered but the wireless module broadcasts the low power radio signal at an interval.

Mobile computing devices 226 may be any portable devices capable of communicating with low power electronic device 210 that include an electronic device controller application 230 installed thereon. Examples include smart phones, tablet computers, laptops, etc.

Mobile computing devices 226 may include a listening module 228 and the electronic device controller 230. Listening module 228 may run in a background of mobile computing devices 226 and may listen for low energy radio signals that include a unique identifier 222 of any low power electronic device 210 manufactured by a particular OEM. Such low energy radio signals may be short range signals that are periodically broadcast by the wireless module 216. Responsive to receiving such a low energy radio signal, listening module 228 may load electronic device controller application 230. Alternatively, listening module 228 may perform other operations such as generate a query and send the query to the server computing device 250.

In one embodiment, electronic device controller application 230 is a program (e.g., an App) that runs on mobile computing devices 226. In one example, electronic device controller application 230 may be a downloadable application for a mobile device. For example, mobile devices may include Android®, iPhone®, or Blackberry® devices capable of running a software application (e.g., Android Smart Bottle software App, iPhone Smart Bottle software App, Blackberry Smart Bottle software App, etc.). Alternatively, electronic device controller application 230 may be firmware and/or a hardware logic on a mobile computing device 226. Electronic device controller application 226 acts both as a controller for low power electronic devices (which may lack their own user interfaces) and as a proxy for providing network connectivity (e.g., an Internet connection) to the low power electronic devices 210. In one embodiment, electronic device controller application 230 includes a user interface 232, a device connecting module 234 and a proxy module 236.

Proxy module 236 communicates with electronic device management service 251 on behalf of low power electronic devices. Proxy module 236 may establish a connection to electronic device management service 251 on server computing device 250 via network 242. Network 242 may include a public network (e.g., the Internet), a private network (e.g., a local area network (LAN) or wide area network (WAN)), or a combination thereof. Network 242 may also include a wired network (e.g., Ethernet network), a wireless network (e.g., an 802.11 network or a Wi-Fi network), a cellular network (e.g., a Long Term Evolution (LTE) network), or combination thereof, and may include a wireless access point, network routers, switches or other similar network devices.

Responsive to mobile computing device 226 receiving data from low power electronic device 210 (e.g., a unique identifier received in a low energy radio signal), proxy module 236 may forward that data to server computing device 250 for processing by electronic device management service 251. Proxy module 236 may generate queries and/or other messages for electronic device management service 251, which may include the data received from the low power electronic device as well as other data generated or received by mobile computing device 226. Data from the low power electronic device 210 may include a unique identifier assigned to the low power electronic device 210, a battery state of the low power electronic device, messages stored on the low power electronic device, acceleration data, speech data, rotational data, proximity sensor data, light sensor data, temperature data, and so on. Data from the mobile computing device 226 may include location data, user account data, date and time, signal strength data (e.g., of the low energy radio signal received from the low power electronic device 210), and so on.

Electronic device management service 251 may include a rules engine 254 (discussed further below) that processes received data to determine whether any actions are to be taken. Proxy module 236 may then receive a response message from the electronic device management service 251 based on an output of the rules engine 254. For example, proxy module 236 may receive an indication as to whether the user of the mobile computing device has permission to access the low power electronic device 210. Proxy module 236 may additionally receive messages to be displayed to the user via user interface 232 and/or instructions to send messages and/or commands to the low power electronic device 210. Such messages and/or instructions may be sent to the low power electronic device 210 whether or not the user has access to the low power electronic device. For example, if the user does not have access to the low power electronic device 210, then such messages and/or commands may be sent to the low power electronic device without notifying the user of the mobile computing device of the presence of the low power electronic device or the fact that the mobile computing device 226 is communicating with the low power electronic device 210.

User interface 232 acts as a remote user interface for low power electronic device 210. User interface 232 may be a graphical user interface or a command line user interface. If a user of the mobile computing device 226 has access to the low power electronic device 210 (decided by electronic device management service 251), then the user interface may display a presence of the low power electronic device 210 as well as command options for controlling the low power electronic device 210.

One example command option includes a command to generate a new message and/or send the new message to the low power electronic device 210. If a user selects a generate message option, user interface 232 may present a virtual keyboard with alphanumeric characters that the user may type on to create a new message. Alternatively, a user may speak into a microphone of the mobile computing device 226, and electronic device controller application 230 may generate an audio file and transmit the audio file to electronic device management service 251 or a separate transcription service to translate the speech into text. The text may then be sent back to the mobile computing device 226 and used for the message. Alternatively the mobile computing device 226 may include a local transcription module that translates speech to text for a new message. Once the new message is created, the user may select a set message command option and select one or more low power electronic devices to send the message to.

Other command options include a display message command, a report messages command, a set unique identifier command, a disable display command, a read battery level command, a read display state command, a change broadcast rate command, and so on. The display message command causes a selected low energy electronic device to display a selected message, which may already be stored on the low energy electronic device or may be sent to the low power electronic device for display.

The set unique identifier command changes a value of a unique identifier assigned to the low power electronic device. Low power electronic devices may be manufactured with a default identifier, and that identifier may be replaced with a unique identifier after the low power electronic device is powered on by a user for a first time. In one embodiment, the unique identifier is a pair of integers (e.g., a major and a minor as defined by the iBeacon protocol). These numerical values in one embodiment are each 2 byte values. The two numerical values may be combined to create a single larger numerical value (e.g., a 4 byte numerical value). By combining, for example, two independent 2 byte values, each of which has 65,536 possible unique values into a single unique 4 byte value, the number of possible unique values is increased many times to 4,294,967,296 possible values.

The report messages command may cause the low power electronic device to notify the electronic device controller 230 of all messages currently stored on the low power electronic device. The low power electronic device may broadcast a low energy radio signal on a periodic basis to notify nearby mobile devices of its identity. The change broadcast rate command may be used to adjust the frequency at which the low power radio signal is broadcast. A less frequent broadcast may improve a battery life of the low power electronic device.

Device connecting module 234 is responsible for establishing wireless connections to low power electronic devices (e.g., to low power electronic device 210). In one embodiment, device connecting module 234 establishes a direct bidirectional peer-to-peer connection to the low power electronic device (e.g., a Bluetooth connection). Alternatively, device connecting module 234 may establish an indirect connection to the low power electronic device (e.g., a Wi-Fi connection to a local area network (LAN) that the low power electronic device is also connected to.

In one embodiment, device connecting module 234 establishes a wireless connection to the low power electronic device responsive to determining that a user of the user device has permission to access the low power electronic device. Such a determination may be made in response to mobile computing device 226 receiving a response from electronic device management service 251 indicating the permission. Alternatively, or additionally, electronic device controller application 230 may cache information on the unique identifiers that the user has permission to access. Responsive to receiving a low power radio signal broadcast by low power electronic device 210, electronic device controller application 230 may compare the received unique identifier to cached unique identifiers. If the received unique identifier matches a cached unique identifier, then electronic device controller application 230 may determine that the user has permission to access the low power electronic device 210 without waiting for a response from electronic device management service 251.

In another embodiment, device connecting module 234 may wait until an instruction to send a command to the low power electronic device 210 is received via the user interface (from a user) or from electronic device management service 215. Responsive to receiving such an instruction, device connecting module 234 may establish the wireless connection to low power electronic device 210. By waiting to establish the wireless connection until data is to be exchanged with the low power electronic device 210, a battery life of the low power electronic device may be conserved.

Server computing device 250 may be a desktop computer, rackmount server, blade server, or other physical machine used to host a server. Server computing device 250 hosts electronic device management service 251. In one embodiment, server computing device 250 includes a virtual machine monitor (also referred to as a hypervisor) that hosts virtual machines, and the electronic device management service is a service that executes in a virtual machine hosted by the server computing device 250. For example, electronic device management service 251 may be a cloud based service that is hosted by Amazon's® Elastic Compute Cloud (EC2).

Electronic device management service 251 is a service for managing the interaction with low power electronic devices and/or other electronic devices. Electronic device management service 251 may include a rules engine 254, an authorization module 256 and/or a messaging module 258. Alternatively, the functionality of one or more of the rules engine 254, authorization module 256 and/or messaging module may be combined into a single module or divided into additional modules.

Authorization module 256 is responsible for determining whether a user of a mobile computing device 226 is authorized to access a low power electronic device. Electronic device management service 251 may receive a query from a mobile computing device 226 (e.g., from a proxy module 236), the query including a unique identifier of a low power electronic device and user account information of a user of the mobile computing device. Authorization module 256 may perform a lookup on the user account and the unique identifier, which may be stored in a data structure (e.g., a database, table, etc.) including assigned unique identifiers 262 and user accounts 264. A user may have access to a low power electronic device if that user owns the device or if access to the device has been shared with the user (e.g., by the owner). If the user account has access to the low power electronic device associated with the received unique identifier, then messaging module 258 sends a response message back to the mobile computing device 226 indicating that the user has access permissions. Otherwise the messaging module 258 may send a response indicating that the user does not have such access permissions.

In some instances a low power electronic device may have a default unique identifier, and may not be associated with any user account. When a query that includes such a default identifier is received, authorization module 256 may determine an unused unique identifier, and may assign that unused unique identifier to the low power electronic device. Authorization module 256 may generate an ownership record for the user account associated with the received query, where the ownership record includes the unique identifier. Messaging module 258 may transmit a response to the mobile computing device 226 from which the query was received, where the response includes the assigned unique identifier. The response may also include an instruction to program the low power electronic device to have the unique identifier. The electronic device controller application 230 of the device connecting module 234 may then connect to the low power electronic device (if a connection has not already been established), and may send an instruction to the low power electronic device to overwrite the default identifier with the assigned unique identifier.

Once ownership of an electronic device is associated with a user, that user may share ownership of the electronic device with other users. In one embodiment, the owner merely provides an address of the additional user (e.g., via the user interface 232 of an electronic device controller application 230 or a web interface provided by the electronic device management service 251). Messaging module 258 then sends an offer email that includes a hyperlink to a location from which the electronic device controller application may be downloaded. Once the recipient downloads and installs the electronic device controller application onto their computing device (e.g., onto a mobile computing device), that user may access the electronic device and perform actions such as set, modify and display messages on that electronic device as if it was their own. At any time an owner may revoke access privileges to an electronic device or a user with which access has been shared may terminate access privileges.

Data from received queries may also be input into rules engine 254. Rules engine 254 may include one or more rules, and may apply these rules to generate commands, perform actions, and/or generate messages based on received data. Actions that are performed may include sending messages and/or notifications to specific users (e.g., to owners), sending messages to mobile computing devices for presentation thereon, sending commands to mobile computing devices that cause them to connect to low power electronic devices and send or forward commands to those low power electronic devices (e.g., to display a message on a low power electronic device), and so on. In one embodiment, authorization module 256 is a component of rules engine 254, and is implemented via an authorization rule and/or a new device rule. Rules engine 254 may include any number of rules, which may be used to perform many different actions. Some example rules and resultant actions are provided, but should not be construed as limiting the scope of the rules engine.

A first example rule is an owner notification rule. The owner notification rule may cause the rules engine to generate a notification which messaging module 258 sends to an owner of an electronic device if a mobile device belonging to someone other than the owner comes within range of the electronic device. For example, when a mobile computing device 226 executing an electronic device controller application 230 comes within range of the low energy radio signal broadcast by low power electronic device 210, that electronic device controller application 230 may generate a query and send the query to electronic device management service 251. The query may include the unique identifier of the low power electronic device, user account information associated with the mobile computing device 226 and a location of the mobile computing device (e.g., as determined via a global positioning system (GPS) receiver in the mobile computing device).

Rules engine 254 may apply the owner notification rule, and may determine that the user account is not for an owner of the low power electronic device 210. Messaging module 258 may then generate a notification that the mobile computing device is near the low power electronic device and that the low power electronic device is at the location, and send the notification to the owner. The notification may be sent by posting it to a social network account of the owner, by sending an email to an email address of the owner, by sending a text message to a phone number of the owner, or by other means. For example, the notification may be sent to a computing device 240 of the owner, which may be a mobile computing device that includes an instance of the electronic device controller application and/or a web browser 244. If the computing device 240 does not include the electronic device controller application 230, then a user of the computing device 240 may use the web browser to access a web page provided by electronic device management service 251. The web page may indicate users who have come within range of low power electronic devices owned by the user, the times of such encounters, locations of those low power electronic devices, and so forth.

Responsive to receiving a notification, a user may send a response back to electronic device management service 251. The response may include a command to send a message to the electronic device, a command to send a message to the mobile computing device and/or a command to perform another action. The electronic device management service 251 may then perform the action in accordance with the command in the response.

A second example rule is a customer welcoming rule. In one embodiment, electronic device management service 251 receives a query from a mobile computing device of a user who does not own a low power electronic device 210. The query may include the user account information of the user of the mobile computing device and the unique identifier of the low power electronic device 210. Rules engine 254 may apply the customer welcoming rule, and determine that the mobile computing device is not associated with an owner of the low power electronic device 210 and came within range of the low power electronic device 210 during business hours. Responsive to such a determination, rules engine 254 may cause messaging module 258 to generate a personalized message welcoming the individual having the user account. Messaging module 258 may send this personalized message to the mobile computing device 226 with an instruction for the personalized message to be displayed on the mobile computing device and/or to be forwarded to the low power electronic device 210 and displayed thereon. For example, the message may be a personalized message that welcomes a user associated with the user account to a bar or other establishment that owns the low power electronic device 210. The message may also be a personalized advertisement or other personalized message.

In some instances low power electronic devices may be logically divided into one or more groups, and a user may select a group to send a message and/or command to. A user with access to multiple electronic devices may generate any desired groupings and/or hierarchical structure of groupings for controlling the electronic devices. This enables the user to easily select a set of electronic devices and perform the same action with regards to each of these electronic devices. For example, a user may generate a top level group for all of the electronic devices in a store, and different second level groups for each floor of the store. The user may then select the top level group to select all electronic devices in the store, or one of the second level groups to select all of the electronic devices on one of the floors.

Figure 3:
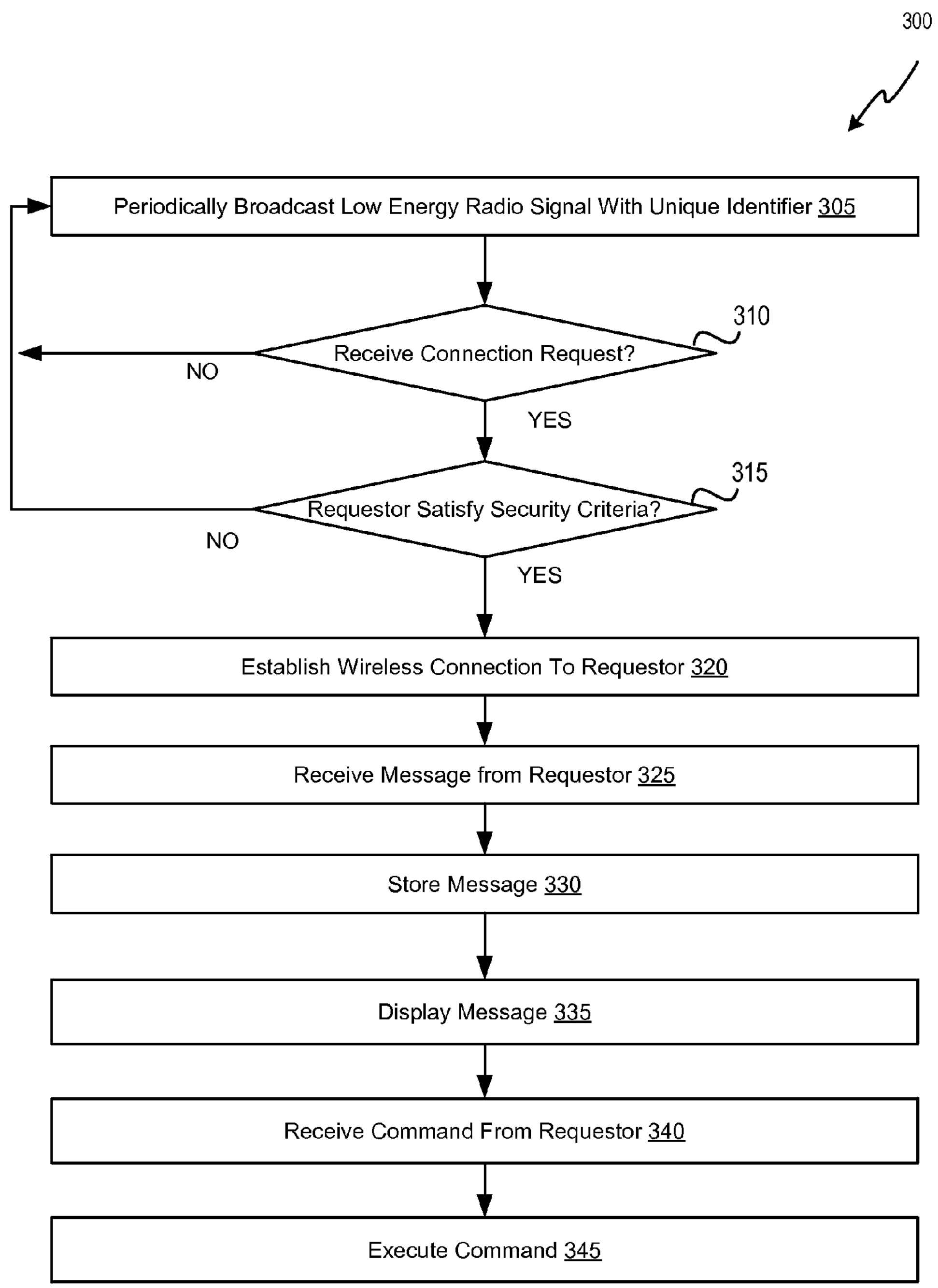
FIG. 3 is a flow chart of an embodiment of a method for interfacing with a mobile computing device by a low power electronic device.
Figure 4A:
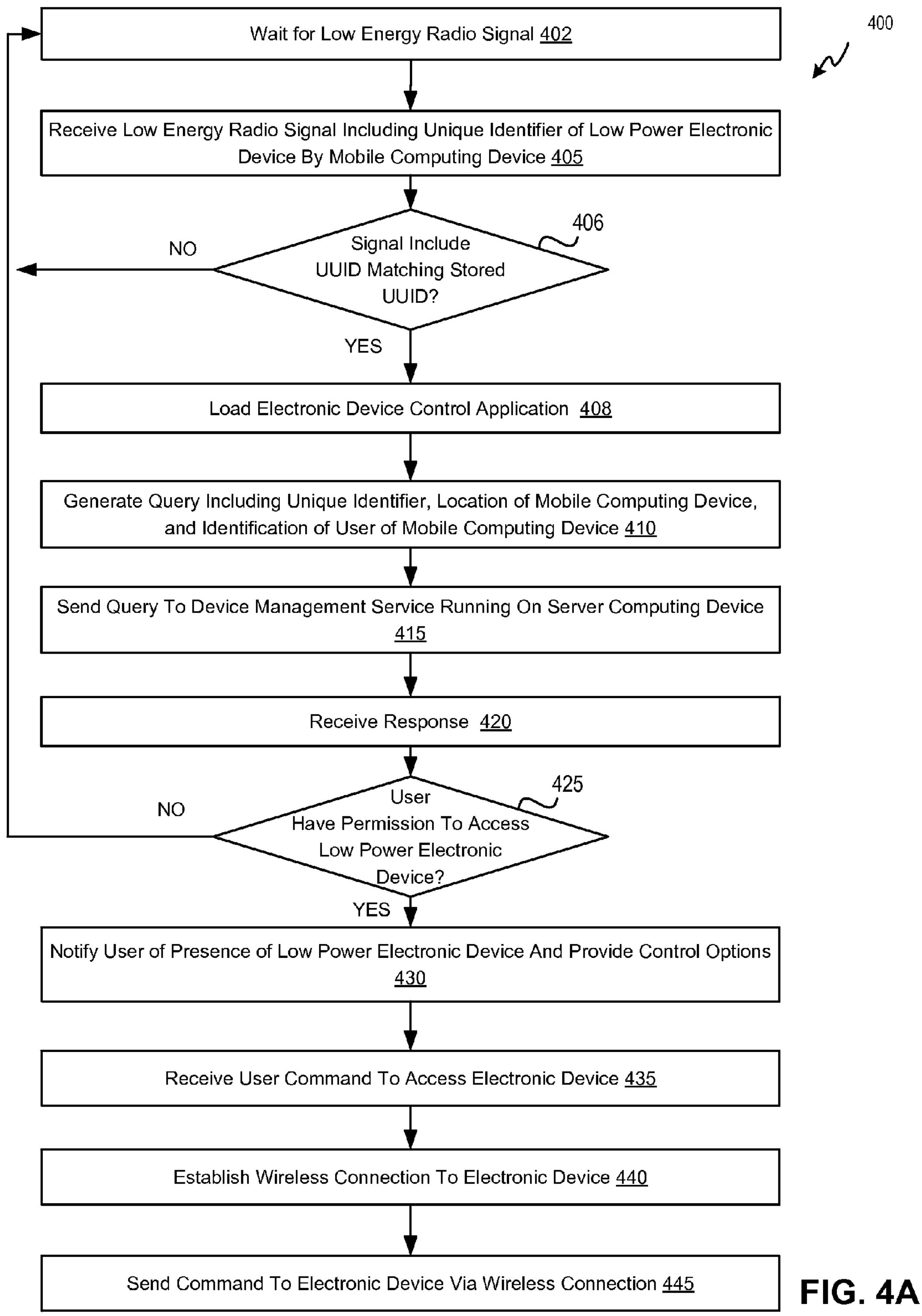
FIG. 4A is a flow chart of an embodiment of a method for interfacing with a low powered electronic device and a server computing device by a mobile computing device.
Figure 4B:
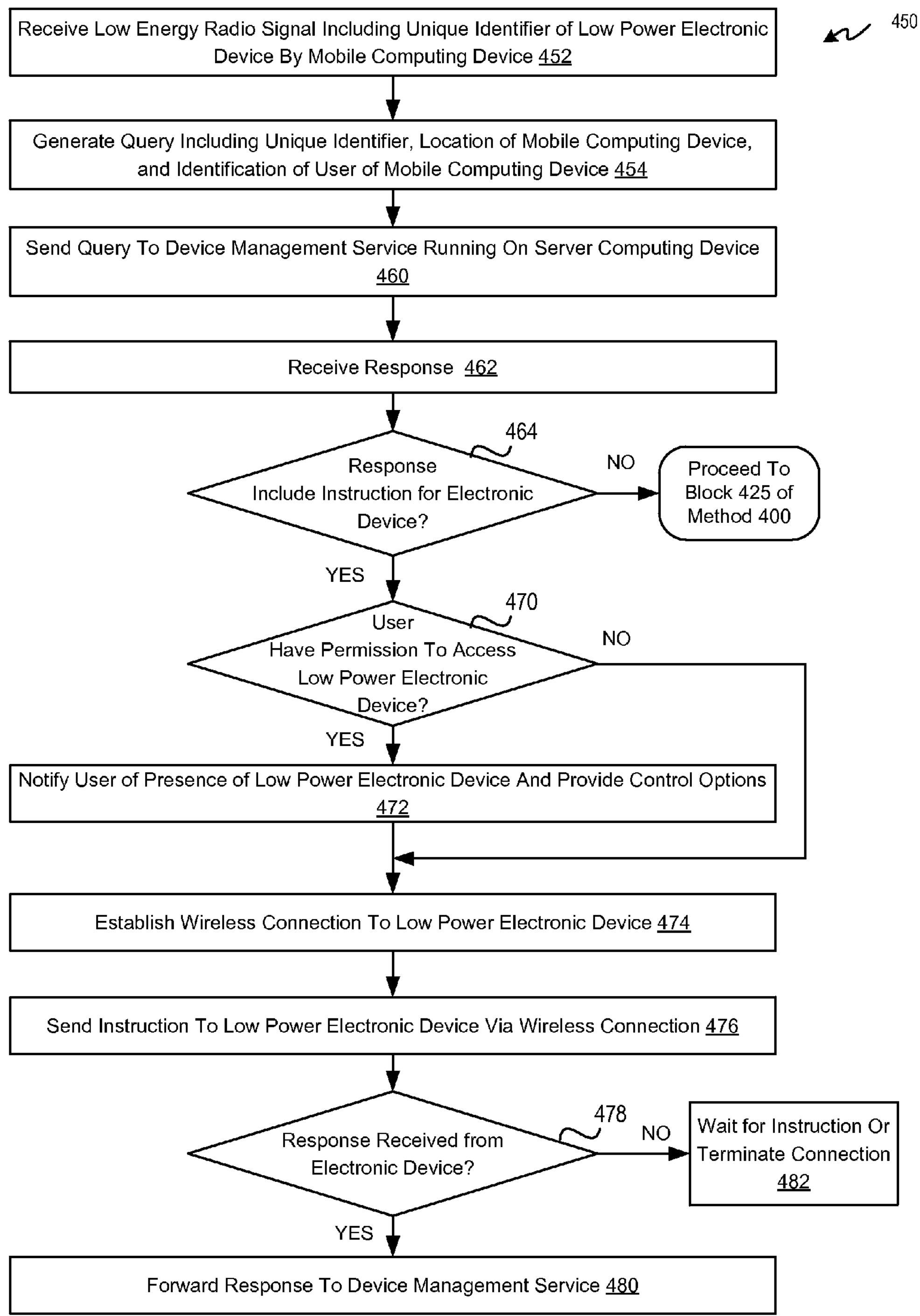
FIG. 4B is a flow chart of another embodiment of a method for interfacing with a low powered electronic device and a server computing device by a mobile computing device.
Figure 5:
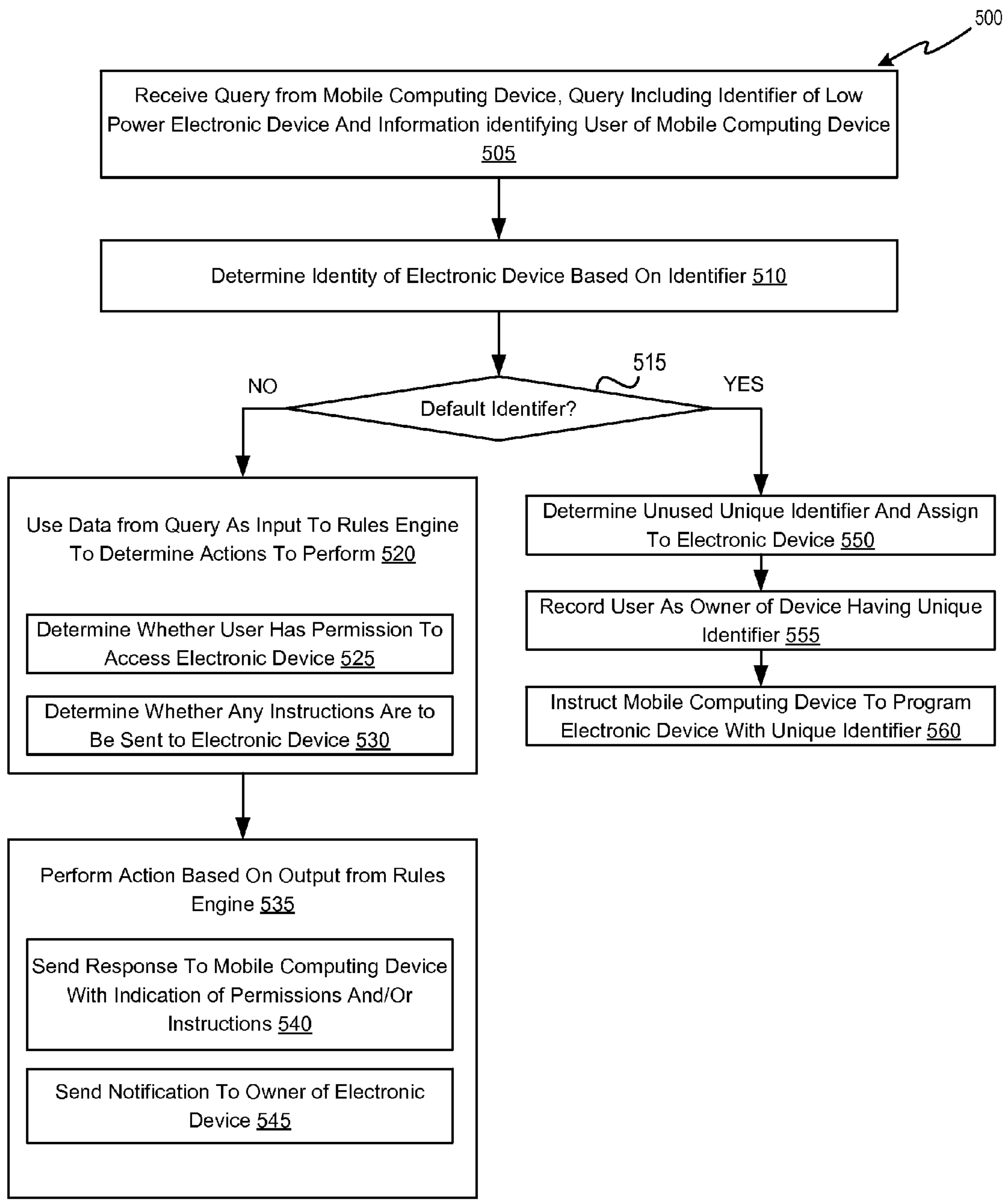
FIG. 5 is a flow chart of an embodiment for implementing an electronic device management service.

FIGS. 3-5 depict flow charts of multiple illustrative examples of methods 300, 400, 450 and 500 (hereafter "methods") for controlling a low power electronic device using a mobile phone and/or remote server. The methods and each of their individual functions, routines, subroutines, or operations may be performed by processing logic of an electric display device (method 300), mobile computing device (methods 400, 450) or server computing device (method 500) executing the method. The processing logic may include hardware, software, firmware, or a combination thereof. For example, processing logic may include a general purpose and/or special purpose processor that executes instructions for performing the methods.

Referring to FIG. 3, at block 305 of method 300 processing logic of a low power electronic device such as an electronic display device or electronic tag periodically broadcasts a low energy radio signal that includes a unique identifier. The periodic broadcast may be generated in accordance with a first wireless protocol, such as a Bluetooth low energy (BLE) protocol or the iBeacon protocol. At block 310, processing logic determines whether a connection request has been received. If a connection request is received, the method continues to block 315. Otherwise, the method returns to block 305.

At block 315, processing logic determines whether a requestor of the connection satisfies one or more security criteria. In one embodiment, processing logic determines whether the connection request includes a password that matches a password that is stored on the low power electronic device. If the passwords match (or other security criterion is met), the method continues to block 320. Otherwise, the method returns to block 305.

At block 320, processing logic establishes a wireless connection to the requestor. This wireless connection may be established in accordance with a second wireless protocol. In one embodiment, the wireless connection is a bidirectional peer-to-peer Bluetooth connection established in accordance with the Bluetooth protocol.

At block 325, processing logic receives a message from the requestor. At block 330, processing logic stores the message. At block 335, processing logic may display the message. In one embodiment, the message is displayed responsive to an additional command from the requestor to display the message.

At block 340, processing logic may receive an additional command to perform some other action. At block 345, processing logic executes the command and performs the action. The command may be configured in accordance with an API of the low power electronic device. Examples of commands include commands to report a battery level, commands to turn on, turn off or change a current mode of operation, and so on. In some instances, the low power electronic device may include onboard sensors such as temperature sensors, sensors that detect a volume or amount of contents of a container to which the low power electronic device is attached, motion sensors, light sensors, proximity sensors, and so on. In such an instance, additional commands may be commands to report on any such sensor measurements.

Referring to FIG. 4A, at block 402 of method 400 processing logic of a mobile computing device executing a listener module waits for a low energy radio signal. At block 405, processing logic receives a low energy radio signal that includes a unique identifier of an electronic device. The unique identifier may include a UUID and a pair of numerical values that combine to form a unique value. If an electronic device controller application is not active, processing logic may check a UUID included in the radio signal at block 406 to determine if the electronic device is of a type that the listener module is listening for. If the UUID matches a stored UUID (e.g., corresponds to a particular OEM), then processing logic may load an electronic device controller application at block 408. If the UUID does not match a stored UUID, then the method returns to block 402.

At block 410, processing logic generates a query including the unique identifier (e.g., including the two numerical values), a location of the mobile computing device and an identification of a user of the mobile computing device (e.g., user account information). At block 415, processing logic sends the query to a device management service running on a server computing device.

At block 420, processing logic receives a response from the server computing device. At block 425, processing logic determines from the response whether the user has permission to access the low power electronic device. If the user does not have such access, the method returns to block 402, and does not notify the user of the presence of the low power electronic device. If the user does have permission to access the low power electronic device, the method continues to block 430.

At block 430, processing logic notifies the user of the presence of the low power electronic device and provides control options for controlling the device. The notification and control options may be displayed via a graphical user interface on the mobile computing device. At block 435, processing logic receives a user command to access the electronic device. The command may be a command to send a message to the electronic device, to retrieve information from the electronic device, to change a mode of the electronic device, and so on. At block 440, processing logic establishes a wireless connection to the electronic device (e.g., a Bluetooth connection). At block 445, processing logic sends a command to the electronic device via the wireless connection to cause the electronic device to perform the desired action. The method may then end, or the user may provide additional user commands for further execution.

Referring to FIG. 4B, at block 452 of method 450 processing logic of a mobile computing device receives a low energy radio signal that includes a unique identifier of an electronic device. At block 454, processing logic generates a query including the unique identifier, a location of the mobile computing device and an identification of a user of the mobile computing device (e.g., user account information). At block 460, processing logic sends the query to a device management service running on a server computing device.

At block 462, processing logic receives a response from the server computing device. At block 464, processing logic determines whether the response includes an instruction for the electronic device. If not, the method may proceed to block 425 of method 400. If the response does include an instruction for the electronic device, the method continues to block 470.

At block 470, processing logic determines whether a user of the mobile computing device has permission to access the low power electronic device. If so, the method continues to block 472, and processing logic notifies the user of the presence of the electronic device and provides control options. If the user does not have access permission, the method proceeds to block 474.

At block 474, processing logic establishes a wireless connection to the electronic device. At block 476, processing logic sends an instruction to the low power electronic device via the wireless connection. At block 478, processing logic determines whether a response has been received from the electronic device. If a response is received, the method continues to block 480, and the response is forwarded to the device management service. If no response is received, the method continues to block 482, and processing logic waits for an instruction to terminate the connection. Alternatively, processing logic may automatically terminate the connection after a predetermined time period (e.g., after 2 seconds, 5 seconds, etc.) if no additional instructions are received.

Referring to FIG. 5, at block 505 of method 500 processing logic of a server computing device receives a query from a mobile computing device. The received query may include an identifier of a low power electronic device and information identifying a user of the mobile computing device. The identifier may include two numerical values (e.g., a 2 byte major and a 2 byte minor). The query may additionally include additional information such as a location of the mobile computing device, a time stamp, and so on.

At block 510, processing logic determines an identity of the electronic device based on the identifier. The identifier may include two numerical values that are concatenated into a single larger numerical value to increase the total number of possible unique values.

At block 515, processing logic determines whether the received identifier is a default identifier. In some instances the identifier may be a default identifier, which may indicate that the electronic device is new. If the identifier is a default identifier, the method proceeds to block 550. Otherwise the method continues to block 520.

At block 550, processing logic determines an unused unique identifier and assigns the unique identifier to the low power electronic device. This may include determining a first numerical value and a second numerical value that can be concatenated to form the single larger value. At block 555, processing logic records a user of the mobile computing device as an owner of the device having the unique identifier. At block 560, processing logic instructs the mobile computing device to program the electronic device to have the unique identifier.

At block 520, processing logic uses data from the query (e.g., the location, unique identifier, user account information, etc.) as an input into a rules engine to determine actions to perform. For example, processing logic may apply one or more rules, such as an authorization rule, a notification rule, etc. At block 525, processing logic may apply an authorization rule to determine whether the user of the mobile computing device has permission to access the electronic device. Processing logic may also apply a notification rule to determine whether a user should be notified of the query. At block 530, processing logic may apply an additional rule to determine whether any instructions are to be sent to the mobile computing device.

At block 535, processing logic performs one or more actions based on an output from the rules engine. If the criteria of multiple rules are satisfied, then multiple different actions may be performed. For example, if a mobile computing device of a non-owner generated the query, then a first rule may cause a notification to be sent to the owner, and a second rule may cause a welcome message to be sent to the mobile computing device. In one embodiment, at block 540 processing logic sends a response to the mobile computing device with an indication of permissions. For example, processing logic may indicate whether the user of the mobile computing device has permission to access the low power electronic device, or if the user has permission to perform specific operations with regards to the low power electronic device (e.g., only has permission to send messages to the electronic device and display messages on the electronic device). The response may also include additional instructions, such as instructions to display a message on the mobile computing device, or instructions for the mobile computing device to send an instruction to the electronic device (e.g., to cause the electronic device to display a message). In one embodiment, at block 545 processing logic sends a notification to an owner of the electronic device. The notification may include an identity of the user, a location of the mobile computing device and/or the electronic device, etc. The location of the electronic device may be inferred based on the location of the mobile computing device and the known communication range of the low power radio signals broadcast by the low power electronic device in embodiments.

Figure 6:
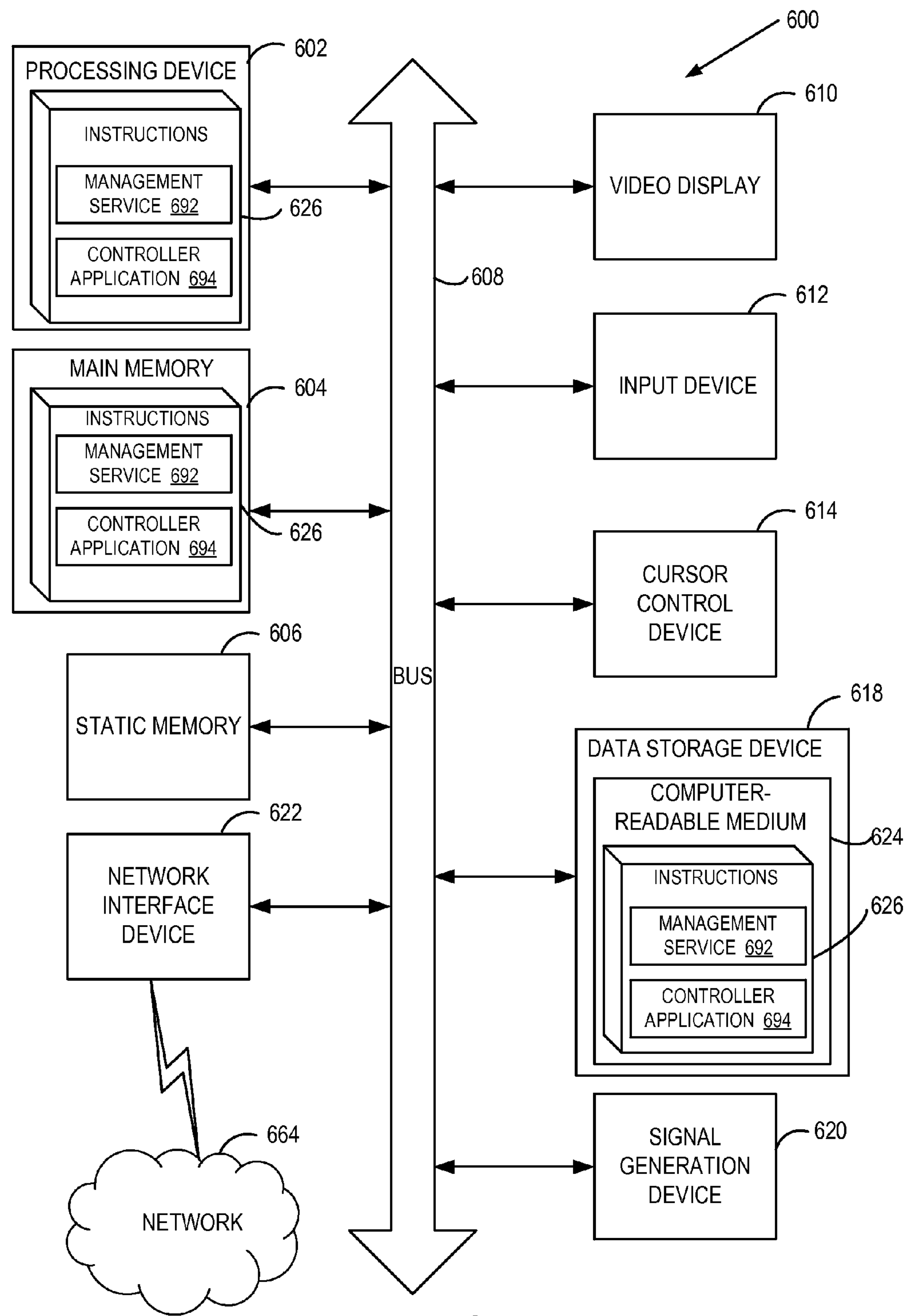
FIG. 6 is a block diagram depicting an example computing device, in accordance with an embodiment of the present invention.

FIG. 6 depicts a block diagram of a computer system operating in accordance with one or more aspects of the present disclosure. In various illustrative examples, computer system 600 may correspond to low power electronic device 210, mobile computing device 226, server computing device 250 and/or computing device 240 of FIG. 2.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a laptop computer, a tablet computer, a server computing device, a network router, switch or bridge, an electronic display device, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a main (volatile) memory 604 (e.g., random access memory (RAM)), a static (non-volatile) memory 606 (e.g., read-only memory (ROM) or electrically-erasable programmable ROM (EEPROM)), and/or a data storage device 618, which may communicate with each other via a bus 608.

Processing device 602 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622 (e.g., a wireless communication module, wireless modem, etc.). Computer system 600 also may include a video display unit 610 (e.g., an LCD), an input device 612 (e.g., a keyboard, touch screen, touchpad, etc.), and a cursor control device 614 (e.g., a mouse).

Data storage device 618 may include a non-transitory computer-readable storage medium 624 on which it may store instructions 626 encoding any one or more of the methods or functions described herein, including instructions encoding methods 300, 400, 450 or 500 for controlling low power electronic devices. For example, data storage device 618 may include instructions 626 for an electronic device management service 692 and/or an electronic device controller application 694, which may correspond to similarly named components described earlier herein.

Instructions 626 may also reside, completely or partially, within main memory 604 and/or within processing device 602 during execution thereof by computer system 600, hence, main memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory tangible medium that is capable of storing or encoding a set of instructions for execution by a computer or device that cause the computer or device to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "receiving", "identifying", "determining", "transmitting", "displaying", or the like, refer to actions and processes performed or implemented by a computer system that manipulates and transforms data represented as physical (electronic) quantities within the computer system registers and memories into other data similarly represented as physical quantities within the computer system memories or registers or other such information storage or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400, 450, 450 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

receiving, by a mobile computing device and from an electronic device that lacks a network connection, an unsolicited low energy radio signal having a first format of a unidirectional wireless communication protocol and comprising a unique identifier assigned to the electronic device;

sending, by the mobile computing device, a query to a remote server computing device, the query comprising the unique identifier and user account information identifying a first user account of a user of the mobile computing device;

receiving, from the remote server computing device, a response indicating that the user is authorized to access the electronic device in response to the remote server computing device determining that the unique identifier is not assigned to a second user account different than the first user account; and responsive to the receiving of the response indicating that the user is authorized to access the electronic device, performing the following comprising:

notifying the user of a presence of the electronic device;

providing one or more control options for controlling the electronic device; and establishing, by the mobile computing device, a wireless connection to the electronic device using a bidirectional wireless communication protocol that is different from the unidirectional wireless communication protocol.

2. The method of claim 1, further comprising:

determining a location of the mobile computing device, wherein the query to the remote server computing device further comprises the location of the mobile computing device.

3. The method of claim 1, wherein the electronic device comprises an electronic display device attached to a bottle, the method further comprising:

receiving a user command to display a message on a display of the electronic display device; and transmitting the message to the electronic device via the wireless connection, wherein the electronic device is to display the message on the display.

4. The method of claim 1, wherein the low energy radio signal is compliant with a low energy Bluetooth® protocol, and wherein the wireless connection is compliant with a second Bluetooth protocol.

5. The method of claim 1, further comprising:

determining, by a background process executing on the mobile computing device, that the unique identifier comprises a universally unique identifier (UUID) identifying a particular original equipment manufacturer (OEM) of the electronic device; and responsive to determining that the unique identifier comprises the UUID for the particular OEM, loading an application comprising a user interface for controlling the electronic device and sending the query to the remote server computing device.

6. The method of claim 5, wherein the unique identifier further comprises a first numerical value represented using a first number of bytes and a second numerical value represented using at least one of the first number of bytes or a second number of bytes, the method further comprising:

concatenating the first numerical value with the second numerical value into a single value usable to identify the electronic device, wherein the single value is represented using a third number of bytes that is larger than the first number of bytes and the second number of bytes, and wherein the query comprises the single value.

7. The method of claim 1, further comprising:

receiving a second low energy radio signal from a second electronic device, the second low energy radio signal comprising a universally unique identifier (UUID) assigned to the electronic device, the UUID associated with an original equipment manufacturer (OEM) of the second electronic device;

determining that a unique identifier has not been assigned to the second electronic device;

sending a second query to the remote server computing device, the second query comprising the information identifying the user of the mobile computing device;

receiving a second response from the remote server computing device, the second response comprising a second unique identifier assigned to the second electronic device, wherein the second unique identifier comprises a first numerical value represented using a number of bytes and a second numerical value represented using the number of bytes; and programming the second electronic device to have the second unique identifier.

8. The method of claim 1, further comprising:

receiving additional low energy radio signals from one or more additional electronic devices;

notifying the user of presences of the additional electronic devices;

establishing wireless connections to each of the additional electronic devices;

receiving a user command to send a message to a group comprising the electronic device and the additional electronic devices; and sending the message to each of the electronic device and the additional electronic devices via respective wireless connections.

9. The method of claim 1, further comprising:

acting, by the mobile computing device, as a proxy for communications between the electronic device and the remote server computing device by forwarding a first message from the electronic device to the remote server computing device and forwarding a second message from the remote server computing device to the electronic device.

10. The method of claim 1, further comprising performing the following responsive to determining that the user is not authorized to access a second electronic device:

acting, by the mobile computing device, as a proxy for communications between the second electronic device and the remote server computing device without notifying the user of the mobile computing device of the presence of the second electronic device.

11. A method comprising:

receiving, by a server computing device, a query from a mobile computing device, the query comprising a unique identifier assigned to an electronic device and user account information identifying a first user account of a user of the mobile computing device, wherein the mobile computing device received the unique identifier from the electronic device via an unsolicited low energy radio signal having a first format of a unidirectional wireless communication protocol, wherein the electronic device lacks a network connection;

determining that the user has permission to access the electronic device in response to determining that the unique identifier is not assigned to a second user account different than the first user account; and responsive to the determining that the user has permission to access the electronic device, sending a response indicating that the user is authorized to access the electronic device to the mobile computing device, the response comprising a permission that grants access for the mobile computing device to the electronic device and instructions for the mobile computing device to notify the user of a presence of the electronic device, to provide one or more control options for controlling the electronic device, and to establish a wireless connection to the electronic device using a bidirectional wireless communication protocol that is different from the unidirectional wireless communication protocol.

12. The method of claim 11, wherein the query further comprises a location of the mobile computing device, the method further comprising:

determining that a second user owns the electronic device based on the unique identifier;

determining a location of the electronic device based on the location of the mobile computing device; and notifying the second user of at least one of the location of the electronic device or a proximity of the mobile computing device to the electronic device.

13. The method of claim 12, further comprising:

receiving an instruction from the second user to send a message to the electronic device; and sending the message to the mobile computing device, wherein the mobile computing device is to forward the message to the electronic device via the wireless connection.

14. The method of claim 11, further comprising:

processing the query using a rules engine;

determining, based on the processing of the query using the rules engine, that a message is to be sent to the electronic device; and transmitting the message to the mobile computing device with an instruction to forward the message to the electronic device.

15. The method of claim 14 further comprising:

determining that the user of the mobile computing device does not have permission to access a second electronic device; and forwarding, by the mobile computing device, a second message to the second electronic device without notifying the user of a presence of the second electronic device or granting the user access to the second electronic device.

16. The method of claim 11, further comprising:

processing the query using a rules engine;

determining, based on the processing of the query using the rules engine, that a message is to be sent to the mobile computing device; and transmitting the message to the mobile computing device, wherein the mobile computing device is to display the message.

17. The method of claim 11, wherein the unique identifier comprises a universally unique identifier (UUID), a first numerical value represented using a first number of bytes and a second numerical value represented using at least one of the first number of bytes or a second number of bytes, the method further comprising:

concatenating the first numerical value with the second numerical value into a single value usable to identify the electronic device, wherein the single value is represented using a third number of bytes that is larger than the first number of bytes and the second number of bytes.

18. The method of claim 11, further comprising:

receiving a second query from a second mobile computing device, the second query comprising information identifying a second user of the second mobile computing device and a request to register a second electronic device;

assigning an unused unique identifier to the second electronic device;

generating an ownership record that associates the user with the assigned unique identifier; and sending a second response to the second mobile computing device, wherein the second response includes instructions for the second mobile computing device to program the second electronic device to have the assigned unique identifier, wherein the unique identifier comprises a first numerical value represented using a number of bytes and a second numerical value represented using the number of bytes.

19. An electronic device comprising:

a body shaped to fit into a recess in a container;

a memory to store one or more messages and to store a unique identifier assigned to the electronic device;

a display, coupled to the memory, to display the one or more messages; and a wireless module to:

periodically broadcast a low energy radio signal comprising the unique identifier using a first wireless communication protocol, wherein the first wireless communication protocol is a low energy unidirectional wireless communication protocol;

establish a wireless connection to a mobile computing device that satisfies an access criterion using a second wireless communication protocol, wherein the second wireless communication protocol is a bidirectional wireless communication protocol, wherein the mobile computing device is associated with a first user account of a user, wherein the access criterion is satisfied in response to a remote server computing device determining that the unique identifier is not assigned to a second user account different than the first user account;

receive a message from the mobile computing device for storage in the memory and display on the display via the wireless connection; and use the mobile computing device as a proxy for sending messages to and receiving messages from the remote server computing device via the wireless connection.

20. The electronic device of claim 19, wherein the unique identifier comprises a universally unique identifier (UUID), a first numerical value represented using a first number of bytes and a second numerical value represented using at least one of the first number of bytes or a second number of bytes, wherein the first numerical value and the second numerical value are concatenated into a single value usable to identify the electronic device, wherein the single value is represented using a third number of bytes that is larger than the first number of bytes and the second number of bytes.

21. The electronic device of claim 19, wherein the low energy radio signal is compliant with the first wireless communication protocol, and wherein the wireless connection is compliant with the second wireless communication protocol.

22. The electronic device of claim 19, wherein the unique identifier initially comprises a universally unique identifier (UUID), a default first value and a default second value before ownership of the electronic device is assigned to a user, and wherein after ownership of the electronic device is assigned to the user, the wireless module is to:

receive a first numerical value represented using a first number of bytes and a second numerical value represented using at least one of the first number of bytes or a second number of bytes; and program the first numerical value and the second numerical value into the memory to overwrite the default first value and the default second value, wherein the unique identifier subsequently comprises the UUID, the first numerical value and the second numerical value.

* * * * *